UNITED STATES PATENT OFFICE.

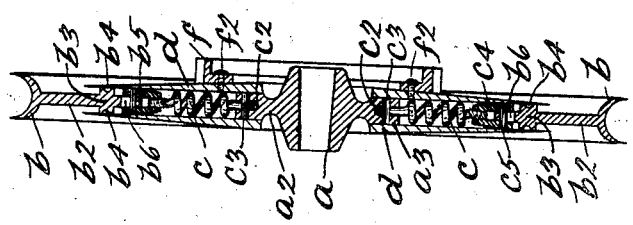

JOSÉ GONZALEZ BABIO, OF BROOKLYN, NEW YORK.

SPRING-WHEEL FOR VEHICLES.

No. 813,397.

Specification of Letters Patent.

Patented Feb. 27, 1906.

Application filed June 10, 1905. Serial No. 264,577.

*To all whom it may concern:*

Be it known that I, JOSÉ GONZALEZ BABIO, a subject of the King of Spain, residing at Brooklyn, in the county of Kings and State of New York, have invented certain new and useful Improvements in Spring-Wheels for Vehicles, of which the following is a specification, such as will enable those skilled in the art to which it appertains to make and use the same.

This invention relates to wheels for vehicles; and the object thereof is to provide improved wheels of this class which have spring supported and retained hubs whereby the jolt, jar, and vibration which usually accompany the use of a vehicle are largely avoided and the wheels made resilient, a further object being to provide wheels of the class specified whereby the use of the ordinary flat or other springs between the body of the vehicle and the axles thereof may be avoided, if desired.

The invention is fully disclosed in the following specification, of which the accompanying drawings form a part, in which the separate parts of my improvement are designated by suitable reference characters in each of the views, and in which—

Figure 1 is a side view of a wheel made according to my invention, part of the construction being broken away; and Fig. 2, a section on the line 2 2 of Fig. 1.

In the practice of my invention I provide a wheel which comprises a central hub $a$, having a central annular web $a^2$, provided with a thickened annular head $a^3$ and a rim $b$, provided with an inwardly-directed annular web $b^2$, having a thickened annular member $b^3$, inwardly from which extend an annular flange $b^5$, and the hub $a$ is connected with the annular flange $b^5$ by means of strong tensional spiral springs $c$, which constitute tensional radial spokes, and the tensional radial spokes $c$, together with their connections with the hub $a$ and the flange or rim $b^5$, are covered and inclosed by annular side or cover plates $d$, secured to the annular head $a^3$ of the web $a^2$, which is connected with or formed integrally with the hub $a$.

The annular thickened member $b^3$ of the web $b^2$ of the rim $b$ is provided in its opposite sides with annular grooves $b^4$, in which may be placed suitable packings, if desired, and the cover-plates $d$ are secured to the annular head $a^3$ by bolts, screws, or other devices $e$.

The inner ends of the tensional spring-spokes $c$ are provided with eyes or rings $c^2$, which are countersunk in the annular head $a^3$ and secured therein by transverse pins $c^3$, and the flange $b^5$, with which the outer ends of the tensional spring-spokes $c$ are connected, is provided with radially-arranged oblong holes $b^6$, and each of said tensional spring-spokes $c$ is secured in a yoke-shaped coupling $c^4$, and these couplings straddle the flange $b^5$ and are secured thereto by pins $c^5$ passing through the holes $b^6$, and by means of this construction the outer ends of the radial tensional spring-spokes $c$ are capable of slight radial movement.

In the form of construction shown a gear-wheel $f$ is secured to one side of the vehicle-wheel by means of screws, bolts, or other devices $f^2$, and this gear-wheel $f$ is employed when my improved wheel is used on a motor-vehicle, the motor by which the vehicle is driven being geared in connection with the wheel $f$; but it will be apparent that my improved wheel may be used on an ordinary vehicle, in which event the gear-wheel $f$ will not be necessary.

In the form of construction shown the outer ends of the tensional radial spokes $c$ are screwed in the coupling $c^4$, and this makes a secure connection between said parts; but this connection may be made in any desired manner.

It will also be observed that both the hub $a$ and the cover-plates $d$, together with the radial tensional spring-spokes $c$, are capable of slight lateral movement, the cover-plates $d$ sliding on the annular thickened member $b^3$ of the web $b^2$ of the rim $b$, and when the vehicle is in use there is a constant but slight movement of the hub which is suspended and supported entirely by the tensional spring-spokes $c$, and if the wheel or wheels in the operation of the vehicle to which they are applied strike any obstacle or obstruction the hub of the wheel or wheels will move in the direction of the obstruction; but as the wheel or wheels are in motion said movement of the hub is modified as will be readily understood, and all jolt, jar, or vibration is taken up by the tensional spring-spokes $c$ and the hub $a$ instantly and under all conditions returns to its central and normal position.

In practice the parts of the wheels are assembled by first securing one of the cover-plates $d$ in position, after which the space around the tensional spring-spokes $c$ is filled with lubricating material, and the other cover-plate $d$ is then secured in position, and in this way the tensional spring-spokes $c$ and their connections are alway kept thoroughly lubricated, and the parts of the wheel are so nicely fitted together that this lubricating material or any material part thereof cannot escape, or a plugged opening may be provided for this purpose.

In the construction shown the rim $b$ of the wheel is concave in cross-section on its outer or bearing surface and is designed to receive an ordinary rubber tire; but my improvement is applicable to vehicle-wheels of any kind or class and the rims thereof may be made or formed in any desired manner.

Although mention has been made of the fact that the hub $a$ is capable at all times of lateral movement, it will be apparent that this description also applies to the rim $b$, the annular thickened member or head $b^3$ of the web $b^2$ being free to move between the outer edges of the cover-plates $d$, but the tensional spring-spokes $c$ always hold both the hub and the rim in proper relative position.

Having fully described my invention, what I claim as new, and desire to secure by Letters Patent, is—

1. In a vehicle-wheel, a hub and rim, said hub being provided with a central outwardly-directed annular web member, and said rim being provided with an inwardly-directed annular web member, spiral tensional spring-spokes connecting said web members, and annular cover-plates secured to one of said web members and inclosing the said spokes and the adjacent edge of the other web member, one of said parts, the rim of the hub being movable toward and from the other part, and the connection of the spokes with one of said web members being a radially-movable connection, substantially as shown and described.

2. In a vehicle-wheel, a hub and rim, said hub and rim being provided one with an outwardly-directed annular flange or web member having an annular head and the other with an inwardly-directed annular flange or rim having an annular head, radial spiral tensional spring-spokes connecting said annular heads, the connection of said spokes with one of said heads being radially movable, and an annular cover-plate secured to one of said annular heads and inclosing said spokes and the other annular head, substantially as shown and described.

3. A wheel for vehicles, comprising a hub having a central annular web member provided with a thickened annular head, a rim provided with a central inwardly-directed annular web having an annular thickened member inwardly from which extends an annular flange, and tensional spiral spokes connecting said annular head and said annular flange, the connection between the said spokes and said flange being radially movable, substantially as shown and described.

4. A wheel for vehicles, comprising a hub having a central annular web member provided with a thickened annular head, a rim provided with a central inwardly-directed annular web having an annular thickened member inwardly from which extends an annular flange, and tensional spiral spokes connecting said annular head and said annular flange, the connection between the said spokes and said flange being radially movable, and said spokes and their connection being inclosed by annular side plates secured to said annular head, substantially as shown and described.

5. In a vehicle-wheel, a hub and rim, said hub being provided with a central outwardly-directed annular web member and said rim being provided with an inwardly-directed annular web member, spiral tensional spring-spokes connecting said web members, and annular cover-plates secured to one of said web members and inclosing the said spokes and the adjacent edge of the other web member, one of said parts, the rim or the hub being movable toward and from the other part, and an annular gear secured to one side of said wheel, substantially as shown and described.

In testimony that I claim the foregoing as my invention I have signed my name, in presence of the subscribing witnesses, this 6th day of June, 1905.

JOSÉ GONZALEZ BABIO.

Witnesses:
  C. J. KLEIN,
  C. E. MULREANY.